United States Patent [19]

Lindner et al.

[11] Patent Number: 6,143,912

[45] Date of Patent: Nov. 7, 2000

[54] PROCESS FOR PREPARING METHYLHYDROGENPOLYSILOXANES HAVING TRIMETHYLSILYL END GROUPS

[75] Inventors: Tassilo Lindner, Mehring-Öd; Gilbert Geisberger, Altötting; Bernd Pachaly, Mehring-Öd, all of Germany

[73] Assignee: Wacker-Chemie GmbH, Munich, Germany

[21] Appl. No.: 09/318,412

[22] Filed: May 25, 1999

[30] Foreign Application Priority Data

Jun. 25, 1998 [DE] Germany .......................... 198 28 390

[51] Int. Cl.[7] .......................... C08G 77/06; C08G 77/12
[52] U.S. Cl. .......................... 556/451; 556/456; 508/207; 528/31; 528/499; 525/474
[58] Field of Search .................... 556/451, 456; 508/207; 528/31, 499; 525/474

[56] References Cited

U.S. PATENT DOCUMENTS 2,491,843  12/1949  Wilcock .
2,758,124   8/1956  Schwenker .
4,382,145   5/1983  Yeboah .

FOREIGN PATENT DOCUMENTS 1 125 180  3/1962  Germany .
2 104 906  3/1983  United Kingdom .

*Primary Examiner*—Robert Dawson
*Assistant Examiner*—Kuo-Liang Peng
*Attorney, Agent, or Firm*—Brooks & Kushman P.C.

[57] ABSTRACT

A process for preparing methylhydrogenpolysiloxanes having trimethylsilyl end groups wherein, in a first step, methyldichlorosilane and trimethylchlorosilane are reacted with at most 0.5 mol of water per mole of hydrolyzable chlorine to give a partial hydrolysate and gaseous hydrogen chloride and, in a second step, the partial hydrolysate, to remove the SiCl groups still present, is treated with water, forming hydrochloric acid.

11 Claims, 1 Drawing Sheet

PROCESS FOR PREPARING METHYLHYDROGENPOLYSILOXANES HAVING TRIMETHYLSILYL END GROUPS

TECHNICAL FIELD

The invention relates to a process for preparing methylhydrogenpolysiloxanes having trimethylsilyl end groups from methyldichlorosilane, trimethylchlorosilane and water.

BACKGROUND ART

In U.S. Pat. No. 2,758,124, methyldichlorosilane and trimethylchlorosilane are reacted with a large excess of water to produce trimethylsilyl-terminated methylhydrogenpolysiloxanes. However, the process is difficult to control and leads to branching in the polysiloxane chain or even gelling of the product. HCl generated appears as hydrochloric acid.

DE-A-1 125 180 describes a process in which, in a first step, methyldichlorosilane and trimethylchlorosilane are hydrolyzed with 1 mol of water per mole of hydrolyzable chlorine in concentrated hydrochloric acid. The concentrated hydrochloric acid contains tetrahydrofuran. In a second step, the crude hydrolysate is admixed with a large amount of water. The oil thus produced is resistant to gelling. However, in this process, large amounts of tetrahydrofuran-containing concentrated hydrochloric acid, as well as dilute hydrochloric acid occur, neither of which can be economically reworked.

DISCLOSURE OF INVENTION

The object underlying the invention is to provide a process for preparing methylhydrogenpolysiloxanes having trimethylsilyl end groups, in which process no branching is formed in the methylhydrogenpolysiloxane and in which a high proportion of the chlorine of the starting material occurs as HCl gas.

DETAILED DESCRIPTION OF THE INVENTION

Figure 1:
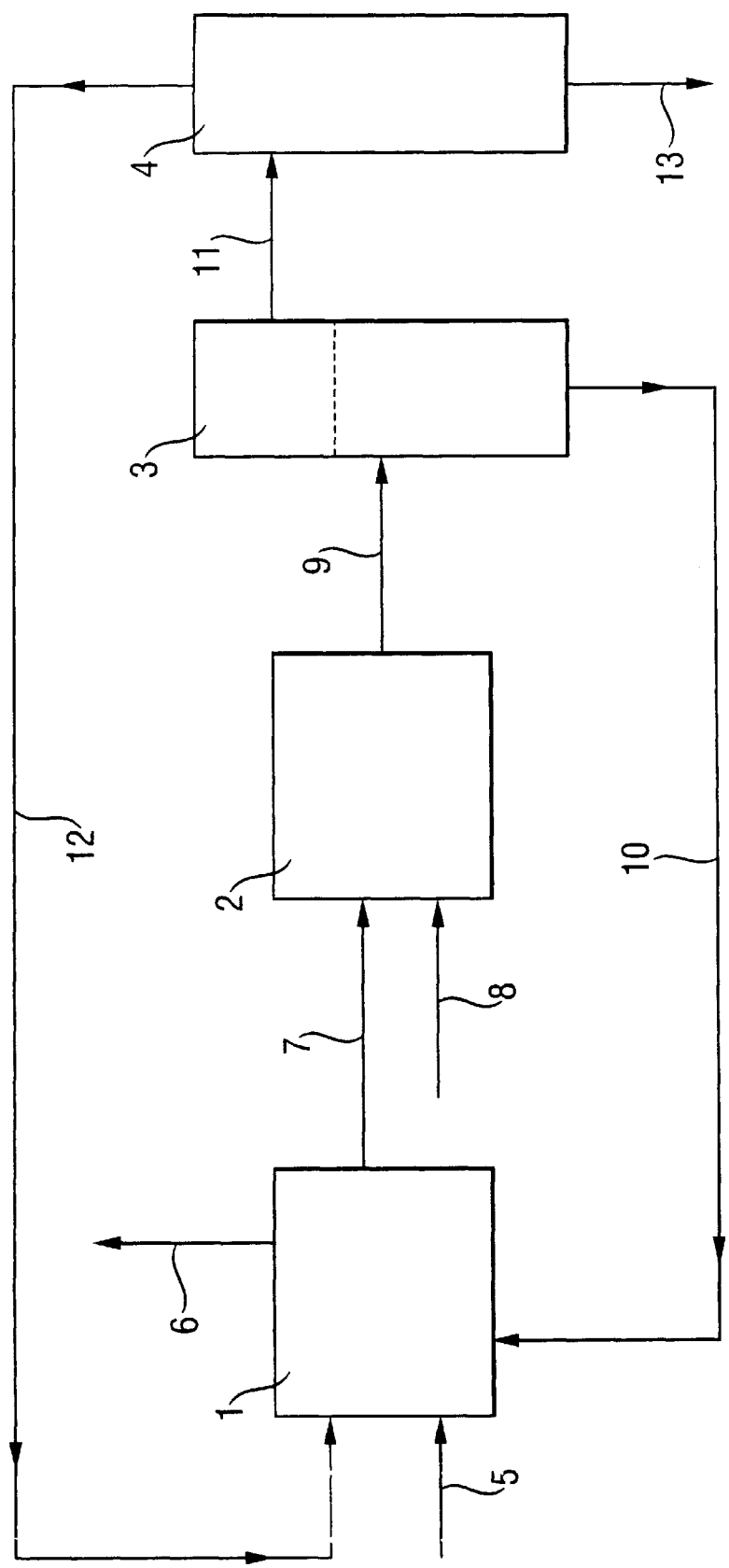
FIG. 1 is a schematic diagram of a continuous process for preparing methylhydrogenpolysiloxanes according to one embodiment of the subject invention.

The invention relates to a process for preparing methylhydrogenpolysiloxanes having trimethylsilyl end groups, in which process in a first step, methyldichlorosilane and trimethylchlorosilane are reacted with at most 0.5 mol of water per mole of hydrolyzable chlorine to give a partial hydrolysate and gaseous hydrogen chloride, and, in a second step, the partial hydrolysate, to remove the SiCl groups still present, is treated with water, forming hydrochloric acid.

The hydrolyzable chlorine is present in the form of SiCl groups. Preferably, in the first step, at least 0.3 mol of water is used per mole of hydrolyzable chlorine.

The partial hydrolysate formed in the first step consists of Cl-terminal and trimethylsilyl-terminal, and optionally OH-terminal, hydrogen methylpolysiloxanes and cyclic hydrogenmethylpolysiloxanes.

The content of SiCl groups still present in the partial hydrolysate is preferably from 0.5 to 5% by weight, in particular from 1.0 to 2% by weight.

The hydrogen chloride gas occurring in the first step can be used directly in another process, for example with methanol to prepare chloromethane, which in turn is used in methylchlorosilane synthesis. Thus, the chlorine can be recycled, without being given off to the environment.

In the second step, the chlorine content of the partial hydrolysate is completely reacted with water. The hydrochloric acid thus formed preferably has an HCl content of from 3 to 20% by weight, in particular from 5 to 10% by weight.

In a particular embodiment, hydrochloric acid formed in the second step is used as a water source in the first step. Preferably, at least 90%, in particular at least 95%, of hydrochloric acid formed in the second step is used in the first step.

In the first step, the hydrochloric acid formed in the second step is then completely converted to gaseous hydrogen chloride and partial hydrolysate and thus consumed.

In a particularly preferred embodiment, in the second step, the amount of water used is at most sufficient so that the water of the hydrochloric acid formed is completely converted in the first step.

The chain lengths and viscosities of the methylhydrogenpolysiloxanes prepared are controlled via the methyldichlorosilane:trimethylchlorosilane weight ratio used. The methyldichlorosilane:trimethyl-chlorosilane weight ratio is preferably from 100:1 to 2:1, in particular from 50:1 to 5:1.

The second step of the process according to the invention is preferably carried out at a temperature of from 0 to 100° C., in particular from 10 to 60° C.

The process according to the invention can be carried out batchwise, semicontinuously or fully continuously, preferably by a fully continuous procedure in both steps, for example in a loop reactor, in particular in a linked plant.

In a particular embodiment, the high-volatility constituents are separated off after the first and/or the second step. The high-volatility constituents are principally cyclic methylhydrogensiloxanes and, if appropriate, solvent. This embodiment is preferred for preparing low-volatility methylhydrogenpolysiloxanes having trimethylsilyl end groups. Preferably, the high-volatility constituents are recycled to the first and/or second step, in particular to the first step.

Preferably, when the high-volatility constituents are being separated off, the amount of substance separated off is replaced by an organic solvent. Preference as an organic solvent is given to toluene.

The separation of the high-volatility constituents can serve to produce cyclic hydrogen methylpolysiloxanes.

FIG. 1 shows a preferred embodiment of the process according to the invention:

In the first step, methyldichlorosilane and trimethylchlorosilane are fed into the loop reactor (1) via line (5), hydrochloric acid is fed via line (10) and the distillate from the thin-film evaporator (4) is fed in via line (12). Gaseous hydrogen chloride is removed via line (6) and the partial hydrolysate prepared is removed via line (7).

The partial hydrolysate is metered into the loop reactor (2) via line (7) and water is metered into the loop reactor (2) via line (8).

All of the reaction mixture is thereafter fed into a separator (3) via line (9). There, the hydrochloric acid is separated off as lower phase and is recirculated to the loop reactor (1) via line (10). The upper phase is fed into the thin-film evaporator (4) via line (11). The high-volatility constituents are recirculated to the loop reactor (1) via line (12). The effluent (13) comprises the methylhydrogenpolysiloxanes having trimethylsilyl end groups. In the following examples, the reference numbers relate to FIG. 1

EXAMPLE 1
(according to the invention)

130 kg/h of methyldichlorosilane and 7.0 kg/h of trimethylchlorosilane are fed into the loop reactor (1) via line (5), 60 l/h of distillate of the thin-film evaporator (4) (comprising 30% by weight of low-molecular-weight methylhydrogensiloxanes and 70% by weight of toluene) are fed in via line (12) and hydrochloric acid from separator (3) is fed in via line (10) at 30° C. The resultant hydrogen chloride is taken off from the reactor in the gaseous state. The partial hydrolysate exiting from the loop reactor (1) is passed, as a homogeneous phase having a chlorine content of 15 g/kg, via line (7) into the loop reactor (2), where it is mixed with 21.5 kg/h of water.

The reaction mixture exiting from the loop reactor (2) is fed via line (9) into the separator (3), where separation takes place into the upper organic hydrolysate phase and the lower aqueous phase which corresponds to an approximately 6% strength by weight hydrochloric acid. The lower phase is recirculated to the loop reactor (1) via line (10). The organic hydrolysate phase is dried by heating in the thin-film evaporator (4) at 130° C. and 10 mbar (absolute). The resulting distillate is fed completely into the loop reactor (1). 73 kg/h of methylhydrogenpolysiloxane having trimethylsilyl end groups are obtained as effluent (13) from the thin-film evaporator (4). This methylhydrogenpolysiloxane has a chlorine content of 2 mg/kg and a viscosity of 25 $mm^2/s$.

EXAMPLE 2
(according to the invention)

Example 1 is repeated with the change that 12.0 kg/h of trimethylchlorosilane instead of 7.0 kg/h are fed into the loop reactor (1) and 22.4 kg/h instead of 21.5 kg/h of water are fed into the loop reactor (2). 76.5 kg/h of methylhydrogenpolysiloxane having a chlorine content of 2 mg/kg and a viscosity of 15 $mm^2/s$ are obtained.

COMPARATIVE EXAMPLE 1
(not according to the invention, with an excess of water)

Example 1 is repeated with the change that 40.0 kg/h instead of 21.5 kg/h of water are fed into the loop reactor (2). A two-phase mixture exits from loop reactor (1). 6 h later, gel formation is observed at the interphase boundary, and after a further 12 h the experiment is terminated by massive gel production.

What is claimed is:

1. A process for preparing methylhydrogenpolysiloxanes having trimethylsilyl end groups, said process comprising:

in a first step, reacting methyldichlorosilane and trimethylchlorosilane with at most 0.5 mol of water per mole of hydrolyzable chlorine to give a partial hydrolysate and gaseous hydrogen chloride, and in a second step, treating the partial hydrolysate with water to remove the SiCl groups still present, forming hydrochloric acid.

2. The process as claimed in claim 1, wherein, hydrochloric acid formed in the second step is used as a water source in the first step.

3. The process as claimed in claim 1, wherein the methyldichlorosilane:trimethylchlorosilane weight ratio is from 100:1 to 2:1.

4. The process as claimed in claim 2, wherein the methyldichlorosilane:trimethylchlorosilane weight ratio is from 100:1 to 2:1.

5. The process as claimed in claim 1, wherein both steps are carried out fully continuously.

6. The process as claimed in claim 2, wherein both steps are carried out fully continuously.

7. The process as claimed in claim 3, wherein both steps are carried out fully continuously.

8. The process as claimed in claim 1, in which high-volatility constituents are separated off downstream of the first and/or second step and these high-volatility constituents are recycled to the first and/or second step.

9. The process as claimed in claim 2, in which high-volatility constituents are separated off downstream of the first and/or second step and these high-volatility constituents are recycled to the first and/or second step.

10. The process as claimed in claim 3, in which high-volatility constituents are separated off downstream of the first and/or second step and these high-volatility constituents are recycled to the first and/or second step.

11. The process as claimed in claim 4, in which high-volatility constituents are separated off downstream of the first and/or second step and these high-volatility constituents are recycled to the first and/or second step.

* * * * *